United States Patent
Lemmers, Jr. et al.

(10) Patent No.: US 10,850,860 B1
(45) Date of Patent: Dec. 1, 2020

(54) INTERNAL COMBUSTION ENGINES WITH UNIDIRECTIONAL COMPOUNDING DRIVES

(71) Applicant: Hamilton Sundstrand Corporation, Charlotte, NC (US)

(72) Inventors: Glenn C. Lemmers, Jr., Loves Park, IL (US); David S. Behling, Belvidere, IL (US); Todd A. Spierling, Rockford, IL (US)

(73) Assignee: HAMILITON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/564,449

(22) Filed: Sep. 9, 2019

(51) Int. Cl.
| | | |
|---|---|---|
| *B64D 35/08* | (2006.01) | |
| *F02B 61/04* | (2006.01) | |
| *F02B 37/12* | (2006.01) | |
| *B64D 27/24* | (2006.01) | |
| *F16H 1/28* | (2006.01) | |
| *F16D 41/00* | (2006.01) | |
| *B64D 27/02* | (2006.01) | |

(52) U.S. Cl.
CPC .............. *B64D 35/08* (2013.01); *B64D 27/02* (2013.01); *B64D 27/24* (2013.01); *F02B 37/12* (2013.01); *F02B 61/04* (2013.01); *F16D 41/00* (2013.01); *F16H 1/28* (2013.01); *B64D 2027/026* (2013.01)

(58) Field of Classification Search
CPC ........ B64D 35/08; B64D 27/02; B64D 27/24; B64D 2027/026; F02B 37/12; F02B 61/04; F16D 41/00; F16H 1/28; F16H 3/44; F16H 47/04
See application file for complete search history.

(56) References Cited

U.S. PATENT DOCUMENTS

| | | | |
|---|---|---|---|
| 3,473,322 A | 10/1969 | Wolf | |
| 3,943,374 A | 3/1976 | Clements | |
| 4,505,117 A | 3/1985 | Matsuoka | |
| 4,729,225 A * | 3/1988 | Bucher | ................ F02B 37/005 60/608 |
| 4,843,822 A | 7/1989 | Okada | |
| 4,884,407 A | 12/1989 | Hatanaka | |
| 5,125,806 A | 6/1992 | Quick et al. | |
| 6,860,726 B2 | 3/2005 | Carter, III et al. | |

(Continued)

FOREIGN PATENT DOCUMENTS

| | | |
|---|---|---|
| EP | 0272680 A2 | 6/1988 |
| WO | 2015000253 A1 | 1/2015 |

OTHER PUBLICATIONS

European Search Report for Application No. 19216240.2, dated Jul. 9, 2020, 6 pages.

*Primary Examiner* — Laert Dounis
*Assistant Examiner* — Loren C Edwards
(74) *Attorney, Agent, or Firm* — Cantor Colburn LLP

(57) ABSTRACT

A compounding drive includes an input member, an epicyclical gear arrangement connected to the input member, an output member connected to the epicyclical gear arrangement, and a hydraulic pump/motor set. The hydraulic pump/motor set connects the epicyclical gear arrangement to the output member through an overrunning clutch for unidirectional communication of mechanical rotation between the input member and the output member. Engine arrangements, aircraft, and methods of compounding internal combustion engines are also described.

20 Claims, 6 Drawing Sheets

(56) References Cited

U.S. PATENT DOCUMENTS

| | | |
|---|---|---|
| 7,490,594 B2 | 2/2009 | Van Dyne et al. |
| 10,082,070 B2 | 9/2018 | Buschur et al. |
| 2016/0245170 A1 | 8/2016 | Lamarre et al. |

\* cited by examiner

INTERNAL COMBUSTION ENGINES WITH UNIDIRECTIONAL COMPOUNDING DRIVES

BACKGROUND

The present disclosure generally relates to compounded engines, and more particularly to compounded engines having unidirectional compounding drives.

Engines, such as internal combustion engines, commonly employ turbochargers. Turbochargers compress air prior to admission to the engine for combustion, generally using residual energy recovered from the exhaust gases issued by the engine during operation. Such turbocharges allow an engine to generate greater output power for a given engine size than otherwise possible, typically with greater efficiency than a non-turbocharged and otherwise equivalent engine.

In some engines the residual energy recovered from the exhaust gases issuing from the engine can exceed the input energy necessary to compress the air for the engine combustion process. To more fully utilize this energy and further improve engine efficiency, compounding can be employed. Compounding is technique of augmenting engine efficiency by returning energy recovered from the engine exhaust that is otherwise unused by a turbocharger, generally through gearing coupling the turbocharger to the engine, when energy in the exhaust stream exceeds that necessary to drive the turbocharger.

Such systems and methods have generally been suitable for their intended purpose. However, there remains a need for improved compounding drives, compounded internal combustion engines and aircraft with compounded internal combustion engines, and methods of compounding output of internal combustion engines.

BRIEF DESCRIPTION

A compounding drive is provided. The compounding drive includes an input member, an epicyclical gear arrangement connected to the input member, an output member connected to the epicyclical gear arrangement, and a hydraulic pump/motor set. The hydraulic pump/motor set connecting the epicyclical gear arrangement to the output member through an overrunning clutch for unidirectional communication of mechanical rotation between the input member and the output member.

In addition to one or more of the features described above, or as an alternative, further embodiments may include an intermediate member connecting the overrunning clutch to the hydraulic pump/motor set.

In addition to one or more of the features described above, or as an alternative, further embodiments may include that the hydraulic pump/motor set includes a fixed displacement hydraulic module, the intermediate member operably connecting the overrunning clutch to the fixed displacement hydraulic module.

In addition to one or more of the features described above, or as an alternative, further embodiments may include that the hydraulic pump/motor set includes a variable displacement hydraulic module, the intermediate member operably connecting the variable displacement hydraulic module to the overrunning clutch.

In addition to one or more of the features described above, or as an alternative, further embodiments may include that the epicyclical gear arrangement additionally includes a pinion gear fixed in rotation relative to the input member; a ring gear extending about the pinion gear and operably connected to the hydraulic pump/motor set; and a planetary gear carrier supporting two or more planetary gears, the planetary gear carrier fixed in rotation relative to the output member, each of the two or more planetary gears supported for rotation relative to the planetary gear carrier and intermeshed between the pinion gear and the ring gear.

In addition to one or more of the features described above, or as an alternative, further embodiments may include that the overrunning clutch connects the ring gear to the hydraulic pump/motor set.

In addition to one or more of the features described above, or as an alternative, further embodiments may include that the hydraulic pump/motor set connects the ring gear to the overrunning clutch.

In addition to one or more of the features described above, or as an alternative; further embodiments may include that the overrunning clutch includes a drive member; a driven member supported for rotation relative to the drive member, and a latch feature for latching the drive member to the driven member, the latch feature fixing the driven member in rotation relative to the drive member when latched, the driven member rotatable relative to the drive member when the latch feature is unlatched.

In addition to one or more of the features described above, or as an alternative, further embodiments may include that the drive member is connected to epicyclical gear arrangement and the driven member is connected to the hydraulic pump/motor set.

In addition to one or more of the features described above, or as an alternative, further embodiments may include that the drive member is connected to the hydraulic pump/motor set and that the driven member is connected to the output member.

In addition to one or more of the features described above, or as an alternative, further embodiments may include a turbine connected to the input member of the compounding drive, and a compressor operably connected to the turbine by an interconnect shaft.

In addition to one or more of the features described above, or as an alternative, further embodiments may include an internal combustion engine with a crankshaft, the crankshaft operably associated with the output member of the compounding drive.

In addition to one or more of the features described above, or as an alternative, further embodiments may include an electric motor/generator set connected to the output member.

In addition to one or more of the features described above, or as an alternative, further embodiments may include a propeller operably connected to the output member of the compounding drive.

An engine arrangement is also provided. The engine arrangement includes an internal combustion engine with a crankshaft, an intake port, and an exhaust port, the exhaust port in fluid communication with the intake port through the internal combustion engine; a compounding drive as described above, the output member of the compounding drive connected to the crankshaft; a turbine with a turbine inlet connected to the input member of the compounding drive, the turbine inlet in fluid communication with the exhaust port of the internal combustion engine; and a compressor having a compressor outlet and operably connected to the turbine by an interconnect shaft, the compressor outlet connected to the intake port of internal combustion engine.

In addition to one or more of the features described above, or as an alternative, further embodiments may include an intermediate member connecting the overrunning clutch to the hydraulic pump/motor set, the epicyclical gear arrangement including a pinion gear fixed in rotation relative to the input member, a ring gear extending about the pinion gear and operably connected to the hydraulic pump/motor set, and a planetary gear carrier rotatably supporting a plurality of planetary gears, the planetary gear carrier fixed in rotation relative to the output member, the planetary gear intermeshed between the pinion gear and the ring gear and supported for rotation relative to the planetary gear carrier; the intermediate member connecting the ring gear to the output member through the overrunning clutch and the hydraulic pump/motor set.

In addition to one or more of the features described above, or as an alternative, further embodiments may include an intermediate member connecting the overrunning clutch to the hydraulic pump/motor set. The overrunning clutch includes a drive member, driven member supported for rotation relative to the drive member, and a latch feature for latching the drive member to the driven member. The latch feature fixes the driven member in rotation relative to the drive member when latched, and the driven member rotatable relative to the drive member when the latch feature is unlatched.

An aircraft is additionally provided. The aircraft has a propeller and includes an engine arrangement as described above. The propeller operably associated with the internal combustion engine and the output member of the compounding drive.

A method of compounding an engine is further provided. The method includes, at a compounding drive as described above, unidirectionally communicating mechanical rotation between the input member and the output member.

In addition to one or more of the features described above, or as an alternative, further embodiments may include that the overrunning clutch connects the epicyclical gear arrangement to the output member when torque carried by the input member exceeds torque carried by the output member, and that the overrunning clutch connects the epicyclical gear arrangement to the output member when torque carried by the output member exceeds torque carried by the input member.

Technical effects of the present disclosure include turbocompounded engines having limited parasitic drag in operating states when the turbo-compressor is not being fed sufficient exhaust to apply power to the engine. In certain embodiments turbo-compressors include an uncoupler module, preventing back-driving of the turbo-compressor to limit (or prevent entirely) damage associated with the limited hydraulic flow that can be present in some operating regimes. In accordance with certain embodiments the uncoupler module can include an overrunning clutch, simplifying the arrangement of the turbo-compressor to provide unidirectional operation when exhaust flow through the turbo-compressor is insufficient to drive the turbo-compressor.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
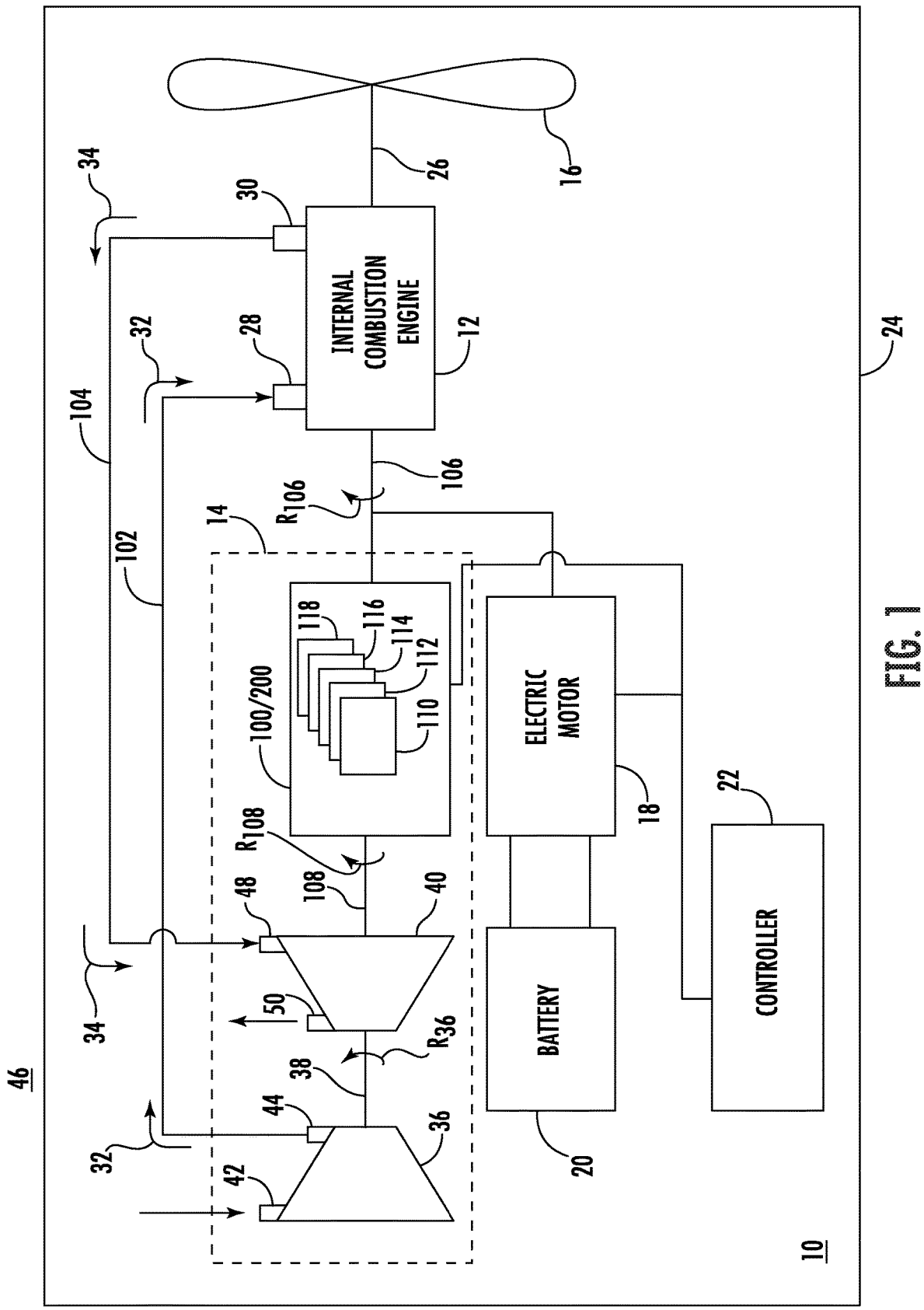
FIG. 1 is a schematic view of an engine arrangement constructed in accordance with the present disclosure, showing a compounding drive having an over-running clutch coupling an input member of the compounding drive to an input member to compound output of an internal combustion engine with power extracted from exhaust issued by the internal combustion engine.

Reference with now be made to the drawings wherein like reference numerals identify similar structural features or aspects of the subject disclosure. For purposes of explanation and illustration, and not limitation, a partial view of an exemplary embodiment of a compounding drive in accordance with the disclosure is shown in FIG. 1 and is designated generally by reference character 100/200. Other embodiments of compounding drives, compounded engine arrangements and aircraft having compounded engine arrangements, and methods of compounding internal combustion engines are provided in FIGS. 2-6, as will be described. The systems and methods described herein can be used for compounding engines carried by vehicles, such as internal combustion engines on aircraft, though the present disclosure is not limited to engines arrangements carried by aircraft or to internal combustion engines in general.

Referring to FIG. 1, an engine arrangement 10 is shown. The engine arrangement 10 includes an internal combustion engine 12, a turbo-compressor 14, and the compounding drive 100. The engine arrangement 10 also includes a propeller 16 (e.g., an aircraft propeller), an electric motor/generator 18, a battery 20, and a controller 22. As shown and described herein the engine arrangement 10 is carried by a vehicle 24, e.g., an aircraft, and is a hybrid engine, the engine arrangement 10 including a generator/motor set 18 electrically connected to a battery 20 and operably connected/associated with the internal combustion engine 12. As will be appreciated by those of skill in the art in view of the present disclosures other types of engine arrangements can also benefit from the present disclosure, such as engine arrangements in terrestrial, marine, and stationary settings by way of example.

The internal combustion engine 12 includes a crankshaft 26, an intake port 28, and an exhaust port 30. The intake port 28 is in fluid communication with the exhaust port 30 through the internal combustion engine 12. The crankshaft 26 is operably connected to the propeller 16, e.g., mechanically connected through a direct mechanical connection or an intervening gearing, for rotating the propeller 16. The intake port 28 is in fluid communication with the turbo-compressor 14 through an intake conduit 102 to receive from the turbo-compressor 14 a flow of intake fluid 32, e.g., compressed air. The exhaust port 30 is in fluid communication with the turbo-compressor 14 through an exhaust conduit 104 to provide to the turbo-compressor 14 a flow of exhaust fluid 34, e.g., combustion products, from which the turbo-compressor 14 extracts work. An output member 106, e.g., shafting or intervening gearing, connects the turbo-compressor 14 to the crankshaft 26 of the internal combustion engine 12, a portion of the work extracted by the turbo-compressor 14 from the exhaust fluid 34 being applied to the crankshaft 26 to compound output of the internal combustion engine 12 and employed to rotate the propeller 16.

The turbo-compressor 14 includes a compressor 36, an interconnect shaft 38, and a turbine 40. The compressor 36 has a compressor inlet 42 and a compressor outlet 44 and is configured to compress air ingested from the external environment 46 to generate a flow of the intake fluid 32. In this respect the compressor inlet 42 is in fluid communication with the intake port 28 of the internal combustion engine 12 through the intake conduit 102. Work required by the compressor 36 to generate the flow of intake fluid 32 is provided to the compressor 36 by the turbine 40 through the interconnect shaft 38, the interconnect shaft 38 operatively associating the turbine 40 with the compressor 36 by communicating work thereto through mechanical rotation $R_{36}$.

The turbine 40 has a turbine inlet 48 and a turbine outlet 50 and is configured to extract work from fluid introduced into the turbine 40 through the turbine inlet 48 prior to issuing the fluid to the external environment 46 through the turbine outlet 50. In this respect the turbine inlet 48 is in fluid communication with the exhaust 30 of the internal combustion engine 12 through the exhaust conduit 104 to receive therethrough a flow of the exhaust fluid 34. The turbine is connected to the interconnect shaft 38 and the output member 106 to provide both the mechanical rotation $R_{36}$ to the compressor 36 compounding mechanical rotation $R_{106}$ to the crankshaft 26 of the internal combustion engine 12 using work extracted from the flow of the exhaust fluid 34. The compounding mechanical rotation $R_{106}$ is provided to the crankshaft 26 through the output member 106 of the compounding drive 100, which can be coupled to the turbine 40 through a direct mechanical connection, intervening gearing, and/or the interconnect shaft 38.

The compounding drive 100 includes an input member 108, a hydraulic pump/motor set 110, and an epicyclical gear arrangement 112. The compounding drive 100 also includes a first intermediate member 114, a second intermediate member 116, and a third intermediate member 118. The input member 108 is connected to the turbine 40. The epicyclical gear arrangement 112 interconnects the input member 108 to the output member 106 and the first intermediate member 114. The second intermediate member 116, the hydraulic pump/motor set 110, and the third intermediate member 118 couple the first intermediate member 114 to the output member 106 to communicate the compounding mechanical rotation $R_{106}$ to the crankshaft 26 of the internal combustion engine 12 using work extracted from the flow of exhaust fluid 34 and in excess of that required to power the compressor 36. In certain embodiments the compounding drive 100 can be as shown and described in U.S. patent application Ser. No. 16/431,084, filed Jun. 4, 2019 by Spierling et al., the contents of which are incorporated herein by reference in its entirety.

As will be appreciated by those of skill in the art in view of the present disclosure, engines equipped with turbo-compressors typically operate in modes wherein the power extracted by turbine exceeds that required to operate the compressor. This allows the excess power extracted by the turbine to be transferred to the engine through a compounding drive, e.g., by operating the hydraulic pump/motor set 110 in a positive torque/speed regime. In some engines it can be necessary to operate the engine in a mode where the residual energy in the engine exhaust is insufficient to power the compressor, such as when an engine is throttled back during a flight-idle operating mode. Such operating modes can reverse the flow of power through the compounding drive, causing the hydraulic pump/motor to set 110 to operate in a negative torque/speed regime.

As will also be appreciated by those of skill in the art in view of the present disclosure, operation of some hydraulic pump/motor sets in a negative torque/speed regime can limit the reliability and/or the expected service life of the hydraulic pump/motor set. Further, operation in negative torque/speed regimes can create parasitic draft on the engine coupled to the turbo-compressor, limiting efficiency of the engine. To allow the internal combustion engine 12 to operate in modes where the exhaust fluid 34 contains insufficient energy to power the compressor 36, limiting (or eliminate entirely) efficiency loses and reliability/service life reductions associated with operation in such modes, the compounding drive 100 includes an over-running clutch 120. The over-running clutch 120 couples the first intermediate member 114 to the third intermediate member 118 through the hydraulic pump/motor set 110, allowing the turbo-compressor 14 to drive the internal combustion engine 12 through the output member 106 and preventing the internal combustion engine 12 from driving the turbo-compressor 14 through the output member 106, as will be described.

Figure 2:
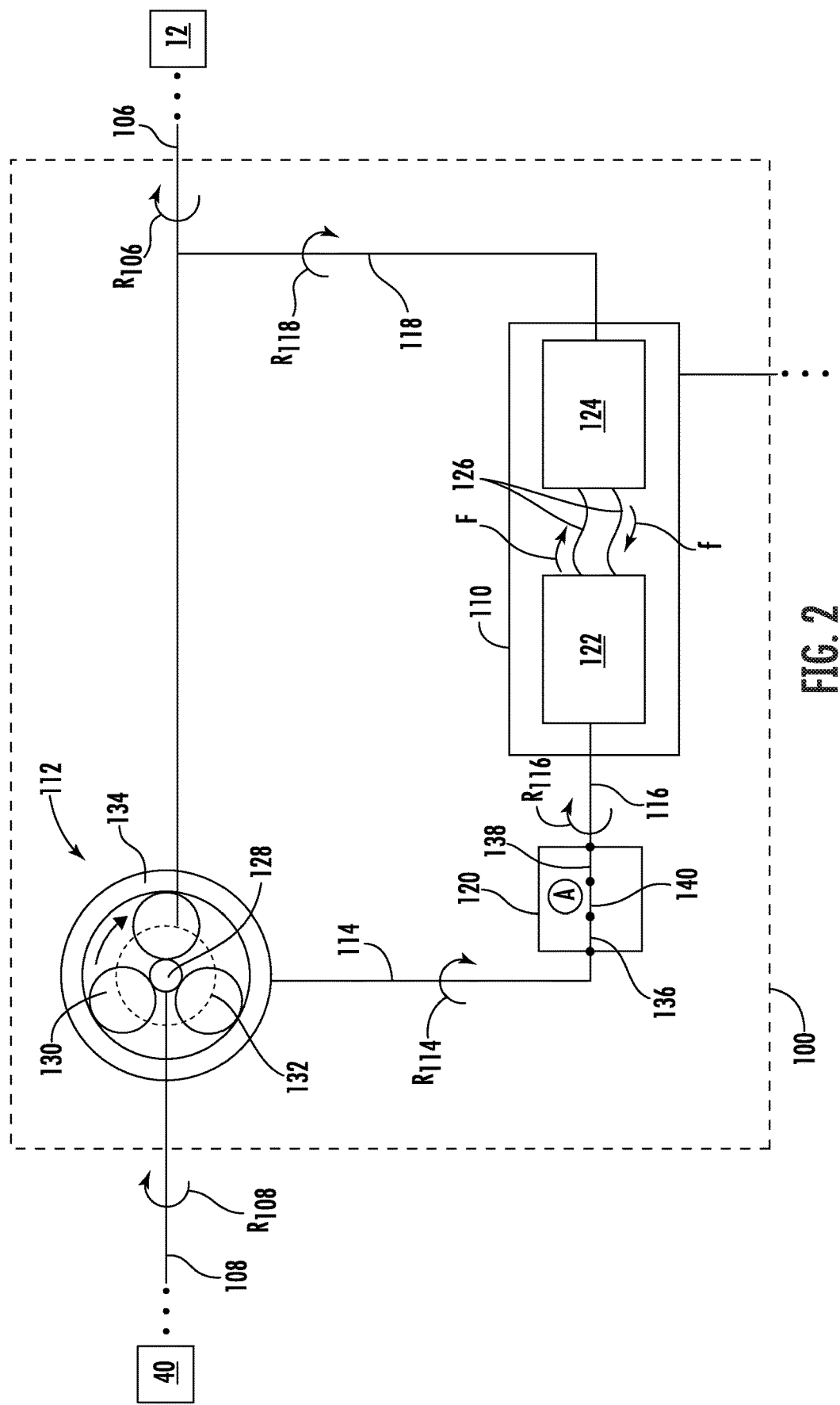
FIG. 2 is a schematic view of the compounding drive of FIG. 1 according to a first embodiment, showing the overrunning clutch connecting an epicyclical gear arrangement to a hydraulic pump/motor set when torque applied to the input member exceeds torque carried by the output member.
Figure 3:
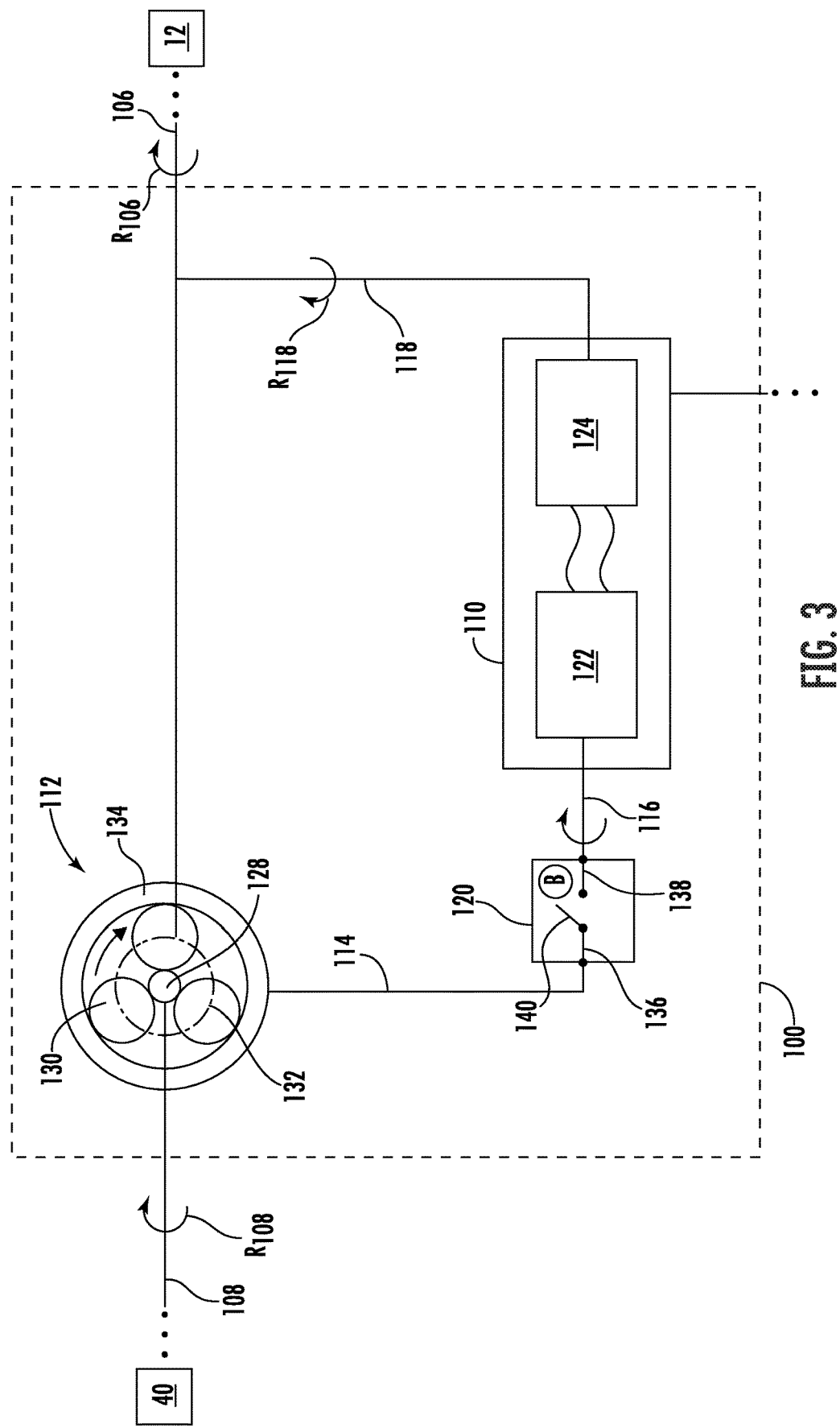
FIG. 3 is a schematic view of the compounding drive of FIG. 1 according to the first embodiment, showing the overrunning clutch disconnecting the epicyclical gear arrangement from the hydraulic pump/motor set when torque applied to the input member is less than torque carried by the output member.

With reference to FIGS. 2 and 3, the compounding drive 100 is shown. The compounding drive 100 includes the input member 108, the epicyclical gear arrangement 112, the output member 106, and the over-running clutch 120. The compounding drive 100 also includes the first intermediate member 114, the second intermediate member 116, the hydraulic pump/motor set 110, and the third intermediate member 118.

The hydraulic pump/motor set 110 couples the epicyclical gear arrangement 112 to the output member 106 and includes a fixed displacement hydraulic module 122, a variable displacement hydraulic module 124, and a hydraulic circuit 126. The hydraulic circuit 126 fluidly connects the fixed displacement hydraulic module 122 to the variable displacement hydraulic module 124. The fixed displacement hydraulic module 122 is connected to the over-running clutch 120 by the second intermediate member 116. The variable displacement hydraulic module 124 is connected to the output member 106 by the third intermediate member 118.

The epicyclical gear arrangement 112 includes a pinion gear 128, a plurality of planetary gears 130, a planetary gear carrier 132, and a ring gear 134. The pinion gear 128 is fixed relative to the input member 108. The planetary gear carrier 132 is fixed relative to the output member 106. The planetary gears 130 are each supported for rotation relative to the planetary gear carrier 132 and are intermeshed between the pinion gear 128 and the ring gear 134. The ring gear 134 is fixed relative to the first intermediate member 114.

The over-running clutch 120 can include, for example a ratcheting free-wheel mechanism or a sprag clutch, and in the illustrated embodiment the over-running clutch 120 couples the epicyclical gear arrangement 112 to the hydraulic pump/motor set 110. In this respect the over-running clutch 120 includes a drive member 136, a driven member 138, and a latch feature 140. The drive member 136 is fixed in rotation relative to the first intermediate member 114 and is connected by the first intermediate member 114 to the ring gear 134. The driven member 138 is fixed in rotation relative to the second intermediate member 116 and is connected by the second intermediate member 116 to the fixed displacement hydraulic module 122. The latch feature 140 movable between drive member 136 and the driven member 138, the latch feature 140 fixing via latching (i.e. latched A) the driven member 138 in rotation relative to the drive member 136 when the drive member 136 overruns the driven member 138.

As shown in FIG. 2, when the drive member 136 overruns the driven member 138, e.g., the rate of the mechanical rotation $R_{108}$ is greater than the rate of the mechanical rotation $R_{106}$, the latch feature fixes the driven member 138 in rotation relative to the drive member 136. This causes the compounding drive 100 to communicate torque carried by the input member 108, e.g., associated with the mechanical rotation $R_{108}$, to the output member 106, e.g., as the mechanical rotation $R_{106}$. Specifically, the ring gear 134 rotates the drive member 136 through the first intermediate member 114, the drive member 136 rotates the driven member 138 through the latch feature 140, and the driven member 138 generates a flow of pressurized hydraulic fluid F within the fixed displacement hydraulic module 122 by operably association of the driven member 138 with the fixed displacement hydraulic module 122 via the second intermediate member 116. The pressurized hydraulic fluid F is carried by the hydraulic circuit 126 to the variable displacement hydraulic module 124, which applies mechanical rotation $R_{118}$ to the third intermediate member 118 and returns low pressure fluid f to the fixed displacement hydraulic module 122 via hydraulic circuit 126. The third intermediate member 118 in turn applies the torque associated with the mechanical rotation $R_{118}$ to the output member 106.

As shown in FIG. 3, when torque on the drive member 136 exceeds torque on the driven member 138, e.g., torque associated with mechanical rotation $R_{114}$ exceeds torque associated with mechanical rotation $R_{118}$, the latch feature 140 fixes the driven member 138 in rotation relative to the drive member 136. Once unlatched, i.e., unlatched B, the driven member 138 is rotatable relative to the drive member 136 and substantially no mechanical rotation is communicated from the second intermediate member 116 to the first intermediate member 114. As will be appreciated by those of skill in the art in view of the present disclosure, this prevents crankshaft 26 (shown in FIG. 1) or the internal combustion engine 12 (shown in FIG. 1) from driving the compressor 36 (shown in FIG. 1).

Figure 4:
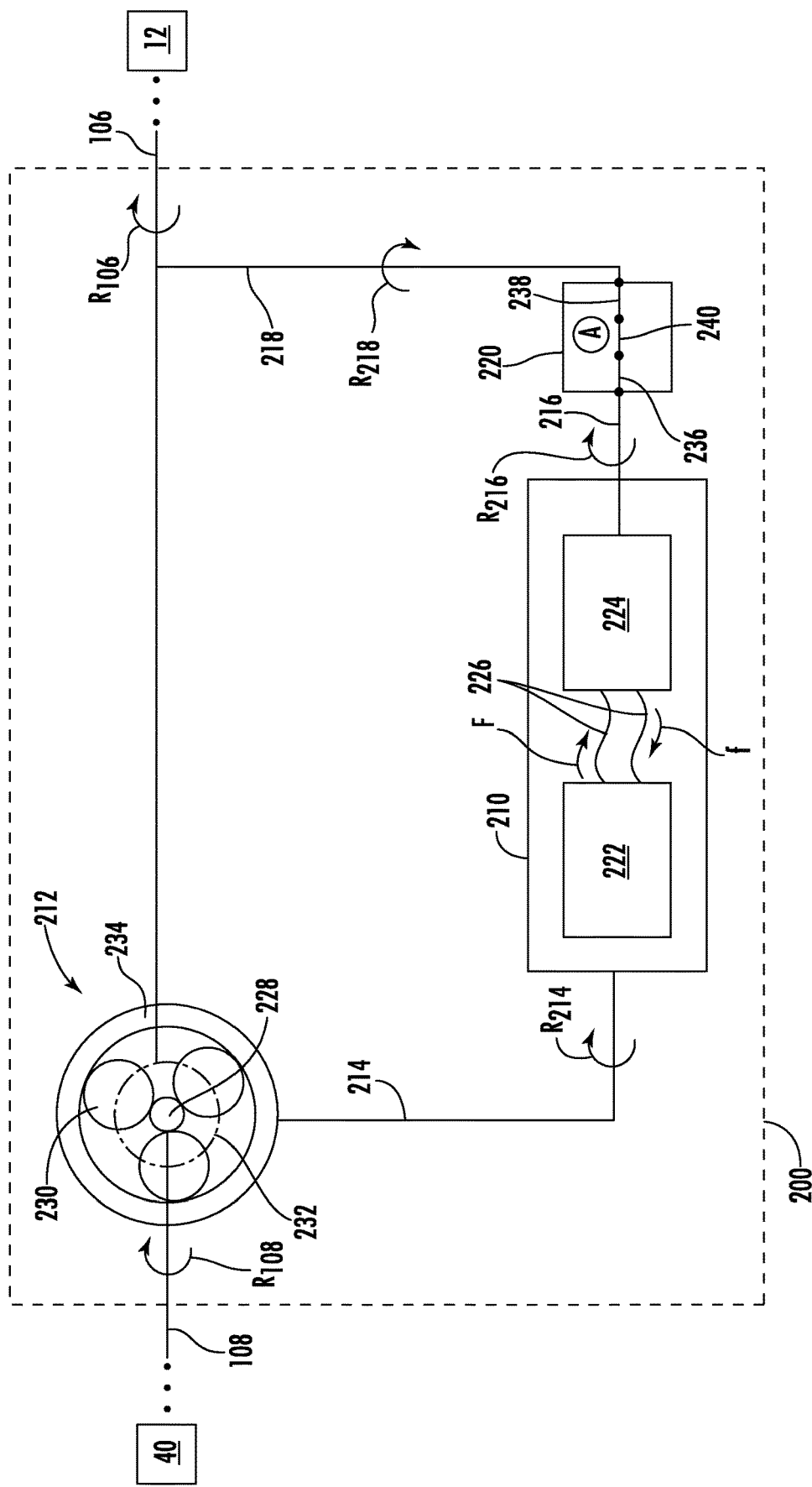
FIG. 4 is a schematic view of the compounding drive of FIG. 1 according to a second embodiment, showing the overrunning clutch connecting the hydraulic pump/motor set to the output member when torque applied to the input member exceeds torque carried by the output member.
Figure 5:
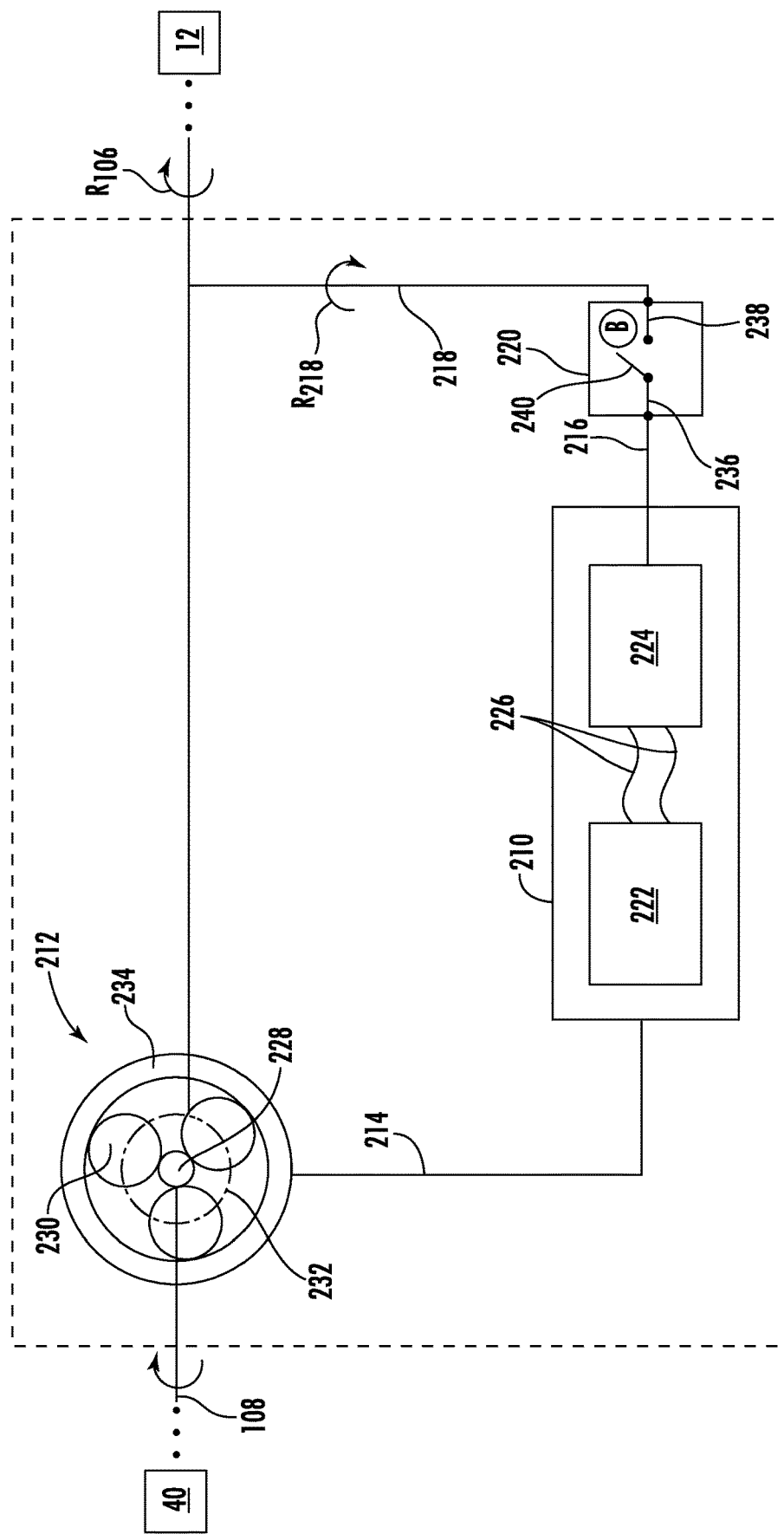
FIG. 5 is a schematic view of the compounding drive of FIG. 1 according to the second embodiment, showing the overrunning clutch disconnecting the output member from the hydraulic pump/motor set when torque applied to the input member is less than torque carried by the output member.

With reference to FIGS. 4 and 5, the compounding drive 200 is shown. The compounding drive 200 is similar to the compounding drive 100 (shown in FIG. 2) and additionally includes an over-running clutch 220 coupling the second intermediate member 216 to the third intermediate member 218. More particularly, the compounding drive 200 includes the input member 108, an epicyclical gear arrangement 212, the output member 106, and the over-running clutch 220. The compounding drive 200 also includes a first intermediate member 214, a second intermediate member 216, a hydraulic pump/motor set 210, and a third intermediate member 218.

The hydraulic pump/motor set 210 couples the epicyclical gear arrangement 212 to the output member 106 and includes a fixed displacement hydraulic module 222, a variable displacement hydraulic module 224, and a hydraulic circuit 226. The hydraulic circuit 226 fluidly connects the fixed displacement hydraulic module 222 to the variable displacement hydraulic module 224. The fixed displacement hydraulic module 222 is in turn connected to first intermediate member 214 and the variable displacement hydraulic module 224 is connected to the second intermediate member 216. The over-running clutch 220 connects the second intermediate member 216 to the third intermediate member 218, the third intermediate member 218 in turn coupling the second intermediate member 216 to the output member 106 through the over-running clutch 220.

The epicyclical gear arrangement 212 includes a pinion gear 228, a plurality of planetary gears 230, a planetary gear carrier 232, and a ring gear 234. The pinion gear 228 is fixed relative to the input member 108. The planetary gear carrier 232 is fixed relative to the output member 106. The planetary gears 230 are each supported for rotation relative to the planetary gear carrier 232 and are intermeshed between the pinion gear 228 and the ring gear 234. The ring gear 234 is fixed relative to the first intermediate member 214.

As in the compounding drive 100 (shown in FIG. 2), the over-running clutch 220 can include, for example a ratcheting free-wheel mechanism or a sprag clutch, and in the illustrated embodiment the over-running clutch 220 couples the epicyclical gear arrangement 212 through the hydraulic pump/motor set 210 to the output member 106 through the third intermediate member 218. In this respect the over-running clutch 220 includes a drive member 236, a driven member 238, and a latch feature 240. The drive member 236 is fixed in rotation relative to the second intermediate member 216 and is connected by the hydraulic pump/motor set 210 and the first intermediate member 214 to the ring gear 234. The driven member 238 is fixed in rotation relative to the third intermediate member 218 and is connected by therethrough to the output member 106. The latch feature 240 is movable between drive member 236 and the driven member 238, the latch feature 240 fixing the driven member 238 in rotation relative to the drive member 236 when torque on the drive member 236 exceeds torque on the driven member 238.

As shown in FIG. 4, when torque on the drive member 236 exceeds torque on the driven member 238, e.g., torque associated with mechanical rotation $R_{216}$ exceeds torque associated with mechanical rotation $R_{218}$, the latch feature 240 fixes the driven member 238 in rotation relative to the drive member 236. Rotational fixation of the driven member 238 with the drive member 236 causes the compounding drive 200 to communicate torque carried by the input member 108, e.g., associated with the mechanical rotation $R_{108}$, to the output member 106, e.g., as the mechanical rotation $R_{106}$. In this respect the ring gear 234 rotates the first intermediate member 214. The first intermediate member 214 in turn pressurizes hydraulic fluid in the hydraulic fluid circuit 244 through operable association with the fixed displacement hydraulic module 222 to generate a flow of pressurized hydraulic fluid F, which the hydraulic circuit communicates to the variable displacement hydraulic module 124.

The variable displacement hydraulic module 224 in converts the flow of pressurized hydraulic fluid F to mechanical rotation $R_{216}$ of the second intermediate member 216, which the (latched) over-running clutch 220 communicates to the third intermediate member 218. The third intermediate member 218 in turn communicates the mechanical rotation $R_{216}$ to the output member 106, which compounds the output of the internal combustion engine 12 (shown in FIG. 1).

As shown in FIG. 5, when the driven member 238 overruns the drive member 236, e.g., the rate of the mechanical rotation $R_{218}$ of the third intermediate member 218 exceeds the rate of the mechanical rotation $R_{216}$, the latch feature 240 unlatches the driven member 238 from the drive member 236. Once unlatched, the driven member 238 is rotatable relative to the drive member 236—and substantially no mechanical rotation is communicated from the third intermediate member 186 to the second intermediate member 116. As will be appreciated by those of skill in the art in view of the present disclosure, this also prevents crankshaft 26 (shown in FIG. 1) or the internal combustion engine 12 (shown in FIG. 1) from driving the compressor 36 (shown in FIG. 1). In certain embodiments the hydraulic pump/motor set 210 can be idled, manually, by the above-described operation of the over-running clutch 220.

Figure 6:
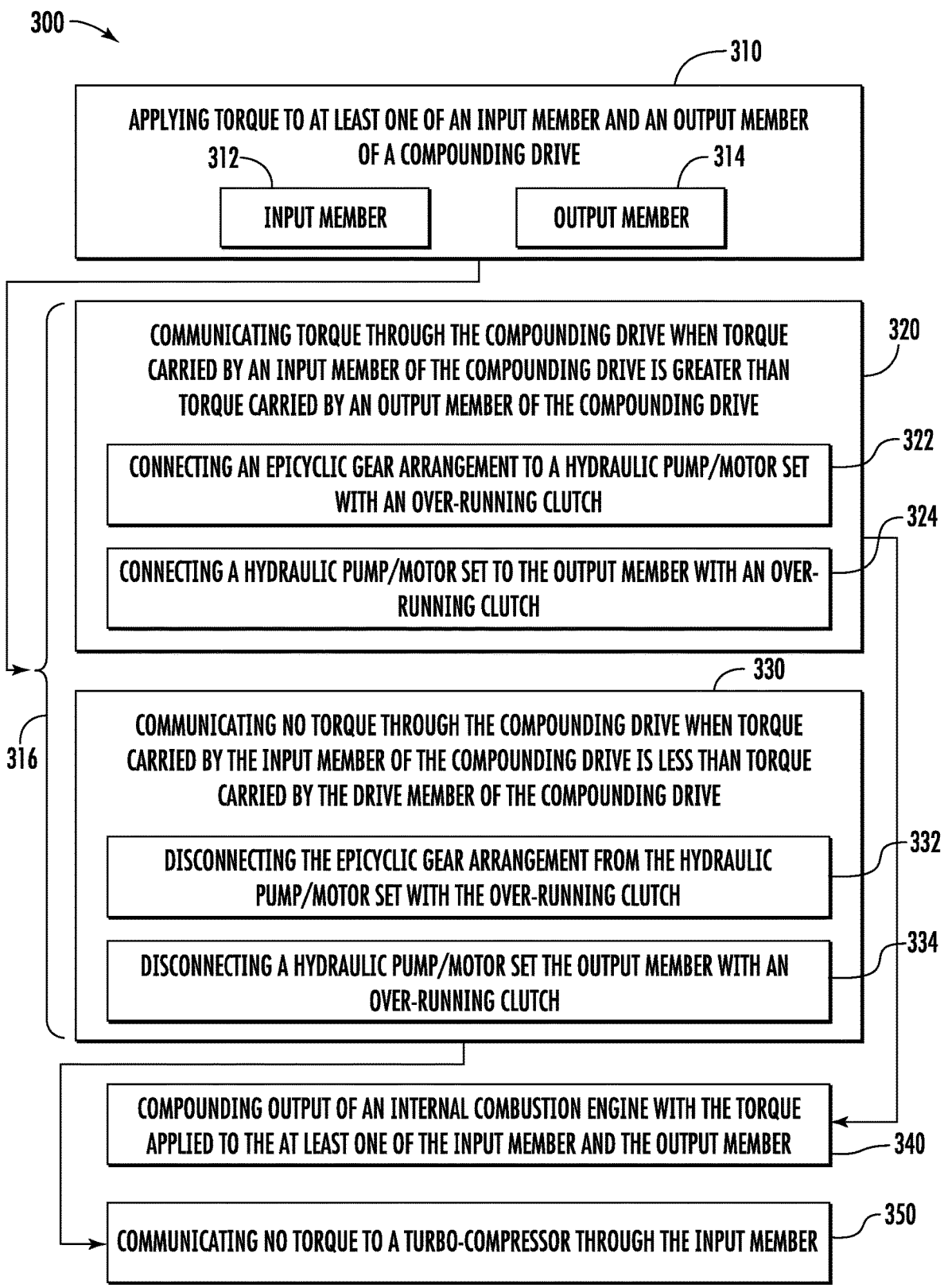
FIG. 6 is a block diagram of a method of compounding output of an engine, showing operations of the method according to an illustrative and non-limiting embodiment of the method.

With reference to FIG. 6, a method 300 of compounding output of an engine, e.g., the internal combustion engine 12 (shown in FIG. 1), is shown. As shown with box 310, torque is recited at a least one of an input member and an output member of a compounding drive, e.g., the input member 108 (shown in FIG. 1) and the output member 108 (shown in FIG. 1) of the compounding drive 100 (shown in FIG. 1). In certain embodiments the torque can be received that the input member, e.g., when a turbo-compressor extracts energy in excess of that required to drive a compressor, e.g., the turbo-compressor 14 (shown in FIG. 1) with the compressor 34 (shown in FIG. 1), as shown with box 312. In accordance with certain embodiments the torque can be received at the output member, e.g., when energy in a flow of exhaust fluid issuing from the internal combustion engine is insufficient to drive the compressor. It is contemplated that torque flow unidirectionally through the compounding drive, e.g., by unidirectionally communicating mechanical rotation through the compounding drive, as shown with bracket 316.

As shown with box 320, when torque carried by the input member is greater than torque carried by the output member, e.g., torque associated with the mechanical rotation $R_{108}$ (shown in FIG. 1) exceeds torque associated with the mechanical rotation $R_{106}$ (shown in FIG. 1), the torque is communicated through the compounding drive. In certain embodiments the torque is communicated by connecting an epicyclical gear arrangement to a hydraulic pump/motor set with an over-running clutch, e.g., the epicyclical gear arrangement 112 (shown in FIG. 2) to the hydraulic pump/motor set 110 (shown in FIG. 2) with the over-running clutch 120 (shown in FIG. 2), as shown with box 322. In accordance with certain embodiments, the torque can be communicated by connecting a hydraulic pump/motor set to the output shaft with an over-running clutch and intervening intermediate member, e.g., the hydraulic pump/motor set 210 (shown in FIG. 4) and the third intermediate member 218 (shown in FIG. 4), as shown with box 324.

As shown with box 330, when torque carried by the input member is less than torque carried by the output member, e.g., the torque associated with the mechanical rotation $R_{108}$ (shown in FIG. 1) is less than torque associated with the mechanical rotation $R_{106}$ (shown in FIG. 1), no torque is communicated through the compounding drive. In certain embodiments an epicyclical gear arrangement can be disconnected from a hydraulic pump/motor set with an over-running clutch, e.g., the epicyclical gear arrangement 112 (shown in FIG. 2) disconnected from the hydraulic pump/motor set 110 (shown in FIG. 2) with the over-running clutch 120 (shown in FIG. 2), as shown with box 332. In accordance with certain embodiments, a hydraulic pump/motor set can be disconnected from the output shaft and an intermediate member with the over-running clutch, e.g., the hydraulic pump/motor set 210 (shown in FIG. 4) from the output shaft 106 (shown in FIG. 1) and the intermediate shaft 218 (shown in FIG. 4) with the over-running clutch 220 (shown in FIG. 4), as shown with box 334.

When the torque carried by the input member exceeds torque carried by the input member the torque is communicated through the compounding drive and applied to the output of the internal combustion engine, compounding the output of the internal combustion engine, as shown with box 340. When the torque carried by the output member exceeds torque carried by the input member no torque is communicated through the compounding drive, and to the turbo-compressor, as shown with box 350.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compounding drive, comprising:
   an input member;
   an epicyclical gear arrangement connected to the input member;
   an output member connected to the epicyclical gear arrangement through a first connection; and
   a hydraulic pump/motor set connecting the epicyclical gear arrangement to the output member through a second connection; and
   an overrunning clutch between the epicyclical gear arrangement and the hydraulic pump/motor set for unidirectional communication of mechanical rotation between the input member and the output member.

2. The compounding drive of claim 1, further comprising an intermediate member connecting the overrunning clutch to the hydraulic pump/motor set.

3. The compounding drive of claim 2, wherein the hydraulic pump/motor set includes a fixed displacement hydraulic module, wherein the intermediate member operably connects the overrunning clutch to the fixed displacement hydraulic module.

4. The compounding drive of claim 2, wherein the hydraulic pump/motor set includes a variable displacement hydraulic module, wherein the intermediate member operably connects the variable displacement hydraulic module to the overrunning clutch.

5. The compounding drive of claim 1, wherein the epicyclical gear arrangement comprises:
   a pinion gear fixed in rotation relative to the input member;
   a ring gear extending about the pinion gear and operably connected to the hydraulic pump/motor set; and
   a planetary gear carrier supporting a plurality of planetary gears, the planetary gear carrier fixed in rotation relative to the output member, each of the plurality of planetary gear supported for rotation relative to the planetary gear carrier and intermeshed between the pinion gear and the ring gear.

6. The compounding drive of claim 5, wherein the overrunning clutch connects the ring gear to the hydraulic pump/motor set.

7. The compounding drive of claim 5, wherein the hydraulic pump/motor set connects the ring gear to the overrunning clutch.

8. The compounding drive of claim 1, wherein the overrunning clutch comprises:
   a drive member;
   a driven member supported for rotation relative to the drive member; and
   a latch feature for latching the drive member to the driven member, the latch feature fixing the driven member in rotation relative to the drive member when latched, the driven member rotatable relative to the drive member when the latch feature is unlatched.

9. The compounding drive of claim 8, wherein the drive member is connected to epicyclical gear arrangement, and wherein the driven member is connected to the hydraulic pump/motor set.

10. The compounding drive of claim 8, wherein the drive member is connected to the hydraulic pump/motor set, and wherein the driven member is connected to the output member.

11. The compounding drive of claim 1, further comprising:
    a turbine connected to the input member of the compounding drive; and
    a compressor operably connected to the turbine by an interconnect shaft.

12. The compounding drive of claim 1, further comprising an internal combustion engine with a crankshaft, the crankshaft operably associated with the output member of the compounding drive.

13. The compounding drive of claim 1, further comprising an electric motor/generator set connected to the output member.

14. The compounding drive of claim 1, further comprising a propeller operably connected to the output member of the compounding drive.

15. An engine arrangement, comprising:
    an internal combustion engine with a crankshaft, an intake port, and an exhaust port, the exhaust port in fluid communication with the intake port through the internal combustion engine;
    the compounding drive as recited in claim 1, wherein the output member of the compounding drive is connected to the crankshaft;
    a turbine with a turbine inlet connected to the input member of the compounding drive, the turbine inlet in fluid communication with the exhaust port of the internal combustion engine; and
    a compressor having a compressor outlet and operably connected to the turbine by an interconnect shaft, the compressor outlet connected to the intake port of the internal combustion engine.

16. The engine arrangement of claim 15, further comprising:
    an intermediate member connecting the overrunning clutch to the hydraulic pump/motor set;
    wherein the epicyclical gear arrangement comprises:
       a pinion gear fixed in rotation relative to the input member;
       a ring gear extending about the pinion gear and operably connected to the hydraulic pump/motor set; and
       a planetary gear carrier rotatably supporting a plurality of planetary gears, the planetary gear carrier fixed in rotation relative to the output member, the planetary gear intermeshed between the pinion gear and the ring gear and supported for rotation relative to the planetary gear carrier; and
    wherein the intermediate member connects the ring gear to the output member through the overrunning clutch and the hydraulic pump/motor set.

17. The engine arrangement as recited in claim 15, further comprising:
    an intermediate member connecting the overrunning clutch to the hydraulic pump/motor set; and
    wherein the overrunning clutch comprises:
       a drive member;
       a driven member supported for rotation relative to the drive member; and
       a latch feature for latching the drive member to the driven member, the latch feature fixing the driven member in rotation relative to the drive member when latched, the driven member rotatable relative to the drive member when the latch feature is unlatched.

18. An aircraft with a propeller carrying the engine arrangement as recited in claim 15, the propeller operably associated with the internal combustion engine and the output member of the compounding drive.

19. A method of compounding an engine, comprising:
    at a compounding drive including an input member, an epicyclical gear arrangement connected to the input member, an output member connected to the epicyclical gear arrangement through a first connection, and a hydraulic pump/motor set connecting the epicyclical gear arrangement to the output member through a second connection; an overrunning clutch between the epicyclical gear arrangement and the hydraulic pump/motor set;
    unidirectionally communicating mechanical rotation between the input member and the output member.

20. The method of claim 19, wherein the overrunning clutch connects the epicyclical gear arrangement to the output member when torque carried by the input member exceeds torque carried by the output member, and wherein the overrunning clutch connects the epicyclical gear arrangement to the output member when torque carried by the output member exceeds torque carried by the input member.

* * * * *